United States Patent [19]

Coscarella et al.

[11] Patent Number: 5,504,878
[45] Date of Patent: Apr. 2, 1996

[54] METHOD AND APPARATUS FOR SYNCHRONIZING PLURAL TIME-OF-DAY (TOD) CLOCKS WITH A CENTRAL TOD REFERENCE OVER NON-DEDICATED SERIAL LINKS USING AN ON-TIME EVENT (OTE) CHARACTER

[75] Inventors: Anthony S. Coscarella, Woodstock; Robert J. Gallagher, Hurley, both of N.Y.

[73] Assignee: International Business Machines Corporation, Armonk, N.Y.

[21] Appl. No.: 364,066

[22] Filed: Dec. 27, 1994

Related U.S. Application Data

[63] Continuation of Ser. No. 39,544, Mar. 29, 1993, abandoned, which is a continuation of Ser. No. 650,315, Feb. 4, 1991, abandoned.

[51] Int. Cl.$^6$ ........................................ H04L 7/00
[52] U.S. Cl. .............. 395/550; 395/200.19; 364/DIG. 1; 364/271; 364/271.1; 364/271.2; 364/271.4
[58] Field of Search ................... 307/269; 327/144, 327/151; 331/1 A, 2; 340/825.2, 825.14; 370/100.1; 371/61; 375/106, 107, 108; 395/200, 550, 800

[56] References Cited

U.S. PATENT DOCUMENTS

| | | | |
|---|---|---|---|
| 3,715,729 | 2/1973 | Mercy | 340/172.5 |
| 3,735,365 | 5/1973 | Nakamura et al. | 395/325 |
| 3,737,901 | 6/1973 | Scott | 343/7.5 |
| 3,761,884 | 9/1973 | Avsan et al. | 340/172.5 |
| 3,932,847 | 1/1976 | Smith | 340/172.5 |
| 4,005,266 | 1/1977 | Lehr et al. | 178/69.1 |
| 4,335,426 | 6/1982 | Maxwell et al. | 395/725 |
| 4,388,688 | 6/1983 | Curlee, III et al. | 395/550 |
| 4,490,821 | 12/1984 | Lacher | 371/1 |
| 4,503,490 | 3/1985 | Thompson | 395/550 |
| 4,531,185 | 7/1985 | Halpern et al. | 395/550 |
| 4,575,848 | 3/1986 | Moore et al. | 371/61 |
| 4,709,347 | 11/1987 | Kirk | 395/200 |
| 4,803,708 | 2/1989 | Momose | 377/28 |
| 4,890,222 | 12/1989 | Kirk | 395/550 |
| 4,937,741 | 6/1990 | Harper et al. | 395/550 |
| 4,988,989 | 1/1991 | Goto | 340/825.21 |
| 5,020,023 | 5/1991 | Smith | 395/250 |
| 5,041,798 | 8/1991 | Moorman et al. | 331/1 A |
| 5,107,489 | 4/1992 | Brown et al. | 370/58.2 |
| 5,146,585 | 9/1992 | Smith, III | 395/550 |
| 5,249,206 | 9/1993 | Appelbaum et al. | 375/107 |

*Primary Examiner*—Thomas C. Lee
*Assistant Examiner*—Lance Leonard Barry
*Attorney, Agent, or Firm*—Lynn L. Augspurger; Richard L. Aitken

[57] ABSTRACT

A central time-of-day reference is integrated into a switch which interconnects I/O devices and host processors in a computer complex via fiber-optic links. A time reference oscillator in the switch serves to generate incrementing reference signals for the central reference and also provides a clock signal for the switch transmissions. Units to which the switch is attached obtain clock signals from their regenerated clocks which are synchronized to the time reference oscillator, and use the regenerated clock signals to control their local time-of-day references. Each unit periodically transmits a signal to the switch requesting a dynamic connection to the switch-based central time-of-day reference in order to receive a time of day message.

12 Claims, 3 Drawing Sheets

METHOD AND APPARATUS FOR SYNCHRONIZING PLURAL TIME-OF-DAY (TOD) CLOCKS WITH A CENTRAL TOD REFERENCE OVER NON-DEDICATED SERIAL LINKS USING AN ON-TIME EVENT (OTE) CHARACTER

This is a Continuation of prior complete U.S. application Ser. No. 08/039,544, filed Mar. 29, 1993, now abandoned, which is a Continuation of prior complete U.S. application Ser. No. 07/650,315, filed Feb. 4, 1991, now abandoned.

BACKGROUND OF THE INVENTION

1. Field of the Invention

The present invention relates generally to the provision of a central reference for local time-of-day clocks in a computer complex, and more particularly to an improved method and apparatus for providing such a central reference for a complex of processors interconnected through a central switch via fiber optic links.

2. Description of the Related Art

In a computer system employing multiple processors and shared resources, a mechanism for synchronizing the local time-of-day (TOD) clocks and keeping them within a specified tolerance is essential. Reliable operation of such a computer system requires maintaining a log record of all accesses to shared resources in the correct order so that recovery can be effected in the event of a failure. The transactions are ordered in the log by means of a time stamp, and all the TOD clocks in the system must be synchronized closely enough so as to ensure consistency of the log. Lack of synchronization can also cause loss of integrity of shared databases and deadlocks.

Processors in a multiple processor complex have their own sources for the TOD clock. Although these clocks operate at the same nominal frequency, they may drift apart resulting in a significant accumulated error over time, unless they are synchronized periodically. A typical drift rate is 50 parts per million (ppm). The clocks of two computers in the complex may then deviate with respect to each other at a maximum rate of 100 ppm. At this rate, it takes 10 seconds for the clocks to be 1 millisecond apart. How often the clock needs to be synchronized depends on how much deviation can be tolerated between the individual computer systems in the complex.

Two distinct approaches to synchronization of TOD clocks have been proposed in the past. If synchronization is required only at a coarse granularity, for example once every 10 seconds, a distributed algorithm can be used. With one such distributed approach, the processors exchange messages containing the local TOD information at periodic intervals and update their clocks to correspond to the fastest clock in the system as closely as possible. The synchronization messages are sent over the same network that is used for data communication. Hence, the queuing delays in each node should be accounted for in calculating the frequency of updates as well as the correction factor to be applied. Since the queuing delays are difficult to estimate, the algorithm is useful only in a conflict-free network where every node is guaranteed access to the network over a time period. Further, because of the shared use of the links, a synchronization message may have to wait for a long period while a large block of data is being transferred. This large variance in communication time causes the granularity of clock synchronization to be large.

An alternate past proposal is to use dedicated links for passing the TOD information between systems allowing deterministic transmission delays. In one example of this approach, timing information is generated external to the processor complex by a reliable and accurate reference clock and distributed to individual processors in the complex over dedicated fiber optic links. The reference clock is duplicated for reliability. Synchronization of individual TOD clocks is achieved at two levels. At a low level, phase-locked loops (PLL's) at the computers are kept synchronized at the bit level to the time reference by transmitting a continuous signal on the links. At a higher level, messages containing TOD information are encoded into the signal stream; the messages are decoded by the individual processors and used to start or verify clock synchronization. Exemplary systems of this type are shown in the commonly assigned applications of T. B. Smith, U.S. Ser. No. 07/262,416, filed Oct. 25, 1988; now U.S. Pat. No. 5,146,585, issued Sep. 8, 1992 L. H. Appelbaum et al., U.S. Ser. No. 07/392,812, filed Aug. 11, 1989 now U.S. Pat. No. 5,249,206, issued Sep. 28, 1993; and W. A. Moorman et al., U.S. Ser. No. 07/537,389, filed Jun. 12, 1990 now U.S. Pat. No. 5,041,798, issued Aug. 20, 1991, the specifications of which are incorporated herein by reference.

This approach using dedicated links provides clock synchronization at a very fine granularity, but it is achieved at a high cost. It is necessary to install and maintain separate boxes for the timing reference as well as a dedicated network of fiber optic links for distribution of the clock information. However, it may not be necessary to verify synchronization frequently if a phase lock loop is used to continuously maintain low level synchronization. Without a requirement for frequent synchronization verification a dedicated link is not necessary.

SUMMARY OF THE INVENTION

It is therefore an object of the present invention to provide an improved system for providing TOD synchronizing information to update local TOD clocks in a complex of processors interconnected through a central switch via fiber optic links; a system which does not require a dedicated link and is compatible with existing CPU instruction protocols.

Briefly, this invention contemplates the provision of a TOD reference source integrated into the switch which interconnects I/O devices and host processors of a system via fiber optic serial links. A time reference oscillator in the switch serves to generate reference signals for the TOD reference and also provides a clock signal for the switch transmissions. Units to which the switch is attached obtain clock signals from their regenerated clocks which are synchronized to the time reference oscillator by means, for example, of a phase lock loop, and use the regenerated clock signals to control their local TOD counters. Each unit periodically transmits a signal to the switch requesting a dynamic connection to the switch-based TOD reference in order to receive a time-of-day message from a time-of-day counter which is part of the TOD reference in the switch. The TOD message comprises a frame of characters giving the time-of-day information. A special character called an on-time-event (OTE) marks the time the time-of-day information is current. At the time of receipt of the OTE character the time-of-day message received from the switch is compared with the contents of the local time-of-day counter to determine whether the unit is maintaining time-of-day synchronization. In addition, these same techniques can be used to initially set a local time-of-day counter and to start it running.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE PREFERRED EMBODIMENTS

Figure 1:
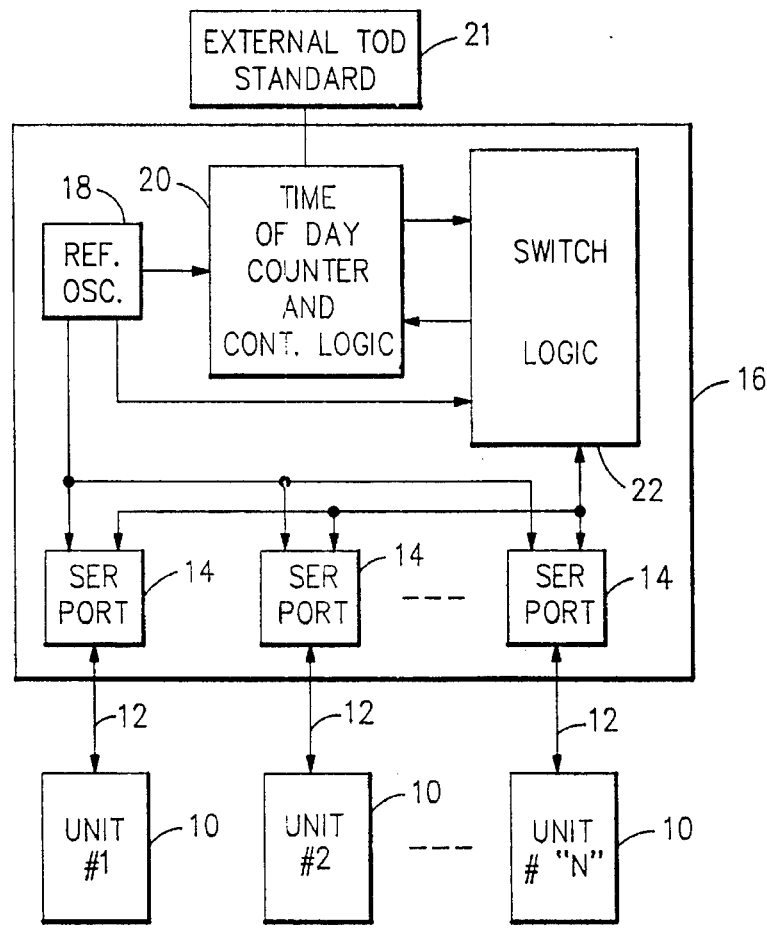
FIG. 1 is a block diagram of a computer complex providing a TOD time reference to units in the complex in accordance with the teachings of this invention.

Referring now to FIG. 1, a computer complex has a number of units 10 connected by serial fiber optic links 12 to serial ports 14 of a switch 16. The switch 16 serves to interconnect the units 10. A unit 10 may be a channel of a central processing unit (CPU), a control unit, or any other unit that may include a local time-of-day clock function generator. The switch 16 may comprise a suitable serial port to fiber optic transmission link for interconnecting the units 10 such as that disclosed in commonly assigned application Ser. No. 07/429,267, filed Oct. 30, 1987 now U.S. Pat. No. 5,107,489, entitled "SWITCH AND ITS PROTOCOL FOR MAKING DYNAMIC CONNECTIONS", granted Apr. 21, 1992 to Paul J. Brown et al; the specification of which is incorporated herein by reference. This patent illustrates a switch which is a dynamic switch having a protocol for establishing dynamic connections in a link by the use of frames, each frame having an identification of the source of the frame, an indication of the destination of the frame for the requested connection, and link controls to maintain, initiate or terminate a connection between the source and destination. The frames are bounded by a start frame delimiter and an end of frame delimiter which may also act as a connect link control and a disconnect link control, respectively, and the connections are made through the dynamic switch having dynamic-switch ports. The state of a dynamic-switch port is changed dependent upon its present state, the dynamic connection requested, and the direction and type of frames passing through the dynamic-switch port.

The switch indicated by the general reference numeral 16, in accordance with the teachings of this invention, includes a time-of-day reference oscillator or clock 18 and a central time-of-day reference 20 which includes a counter, control logic and buffer storage. Inputs from oscillator 18 increment the central time-of-day reference 20 which accumulates and outputs via switch logic 22 a time-of-day message, such as year, month, day, hour, minute, second, and an on-time-event character exactly at the time specified in the time-of-day message. The central time-of-day reference 20 may be of a suitable design known in the art. An external standard 21 for time-of-day information such as a radio signal (i.e. a national time standard that is broadcast by radio signal under the call letters WWV) or a highly accurate standalone reference may be used to ensure the long-term accuracy of central time-of-day reference 20. The central time-of-day reference 20 is coupled via switching logic 22 to serial switch ports 14. The reference oscillator 18 is directly coupled to switch ports 14 and serves as a transmit clock for all transmissions on the links 12, including data as well as TOD messages. This clock information is recovered at the units 10 and is used to maintain synchronization of their local time-of-day references.

Figure 2:
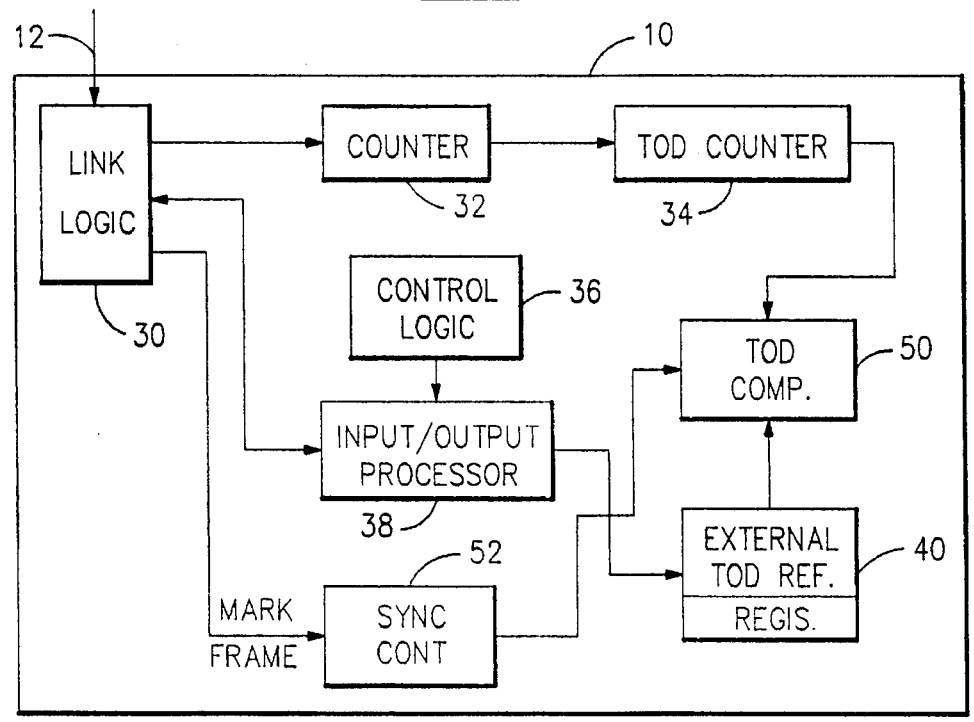
FIG. 2 is a block diagram for synchronizing a local time-of-day clock in accordance with the teachings of this invention.

Referring now to FIG. 2, it shows one example of how the local time-of-day reference of each unit 10 can be synchronized to the central time-of-day reference 20 through the serial switch 16 over the non-dedicated serial fiber optic links 12. The step or "tick" to the local time-of-day reference is derived from the basic data transmission on the link 12. A link logic module 30 formats data received on link 12 for utilization by the unit 10 with which it is associated and similarly formats data from the unit for transmission on the link. Link logic 30 generates a step pulse or "tick" synchronized by the incoming data stream at a predetermined interval; for example, every character time (50 nanoseconds) or alternatively every bit time. This step pulse is coupled to a modulo 20 counter 32 in the case of character time steps, which in turn provides a step pulse once every microsecond to increment the 1-microsecond position in a local time-of-day reference counter 34, which may be of a conventional design well known and widely used in the art.

At some preselected rate, a time-of-day controller 36 sends a request to an input/output processor (IOP) 38 to verify that the value in the local time-of-day reference 34 is synchronized with the value in the central time-of-day reference 20. The unit 10 makes a contact request to the switch 16 using standard protocols and, when connected, the IOP 38 transmits the verification request via the link 12 and the switching logic 22 to the central time-of-day reference 20. As will be explained in more detail in connection with FIG. 3, the central time-of-day reference 20 transmits back a time-of-day message of the general format "at the tone the time will be HH:MM:SEC:XX:YY", a format compatible with the format kept by the local time-of-day reference 34. The time-of-day message provided via the switch 16 to the unit 10 is stored by IOP 38 in a synchronization register 40. The central time-of-day reference 20 also subsequentially transmits an on-time-event character to the unit 10 and then breaks the connection through the switch 16. The on-time-event character is delayed at the switch 16 so that all on-time-event characters arrive at the respective ends of the links 12 at the correct time, allowing for transmission time, plus or minus some small tolerance.

The logic module 30 forwards the on-time-event character to a time-of-day synchronization controller 52 which causes a comparison to be made in comparator 50 between the time-of-day value in register 40 and the time-of-day value in the local reference 34 at the instant established by the on-time-event character.

Figure 3:
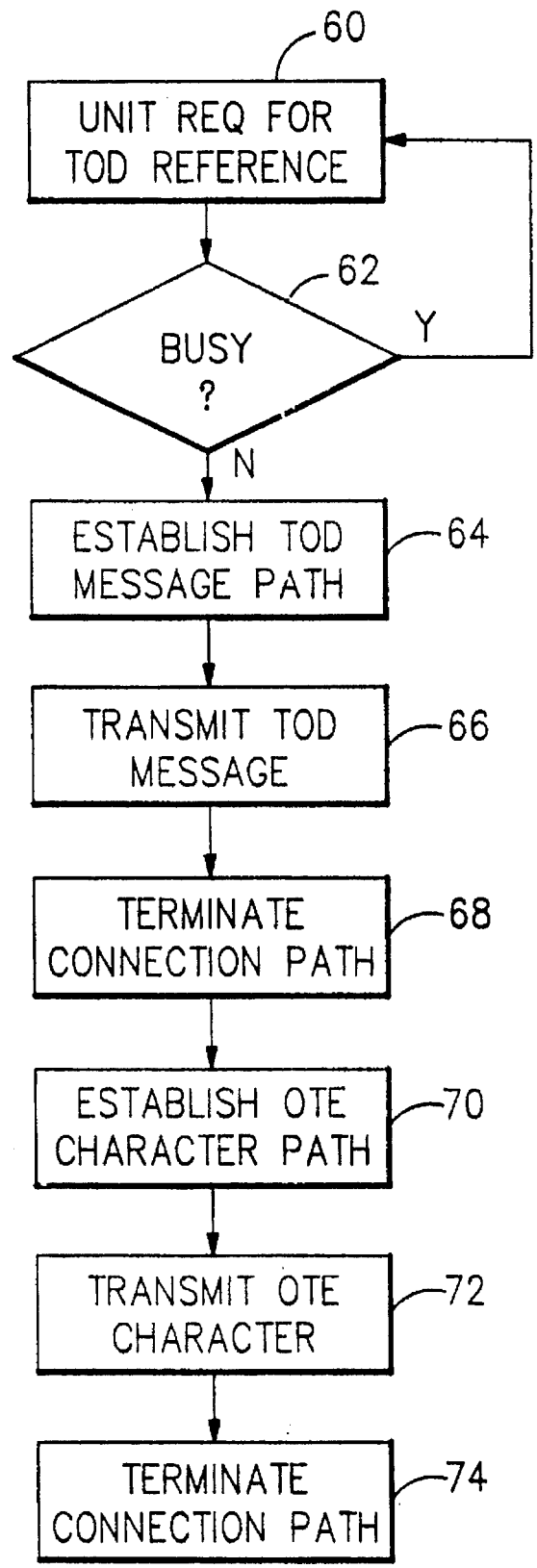
FIG. 3 is a flow diagram of the operation of the system shown in FIG. 1 in transmitting a time-of-day reference information.

Referring now to FIG. 3, a time-of-day reference request from a unit 10 may be transmitted in a standard data format with the central time-of-day reference 20 address as the destination and the unit's address as the source. This request is indicated in function box 60. At switch 16, the current time reference data, including the time at the next on-time-event, parameters used for time conversion, and time reference status information will normally be formatted and buffer stored and the time-of-day reference logic 20 will notify the unit 10 from which the command is received. As indicated in function box 62, if the central time-of-day reference 20 has previously received a READ TIME reference command from a different unit 10 and not yet transmitted an on-time-event character or the command is received too close to the next on-time-event to assure that the TOD data can be used by the unit, then a Busy is returned to the address of the unit 10 which is the source of the request.

The transmission of a TOD reference message to the unit 10 consists of several frame transmissions. The first, as indicated by function box 64, is a control frame sent before or with the time-of-day message to establish a connection via the switch logic 22. Following the establishment of a connection (block 64), a time-of-day message will be transmitted to the unit 10 (block 66). The TOD message may be in a standard data format with a fixed unique message in the data field. When the TOD message has been transmitted the connection is terminated (block 68). A control frame is next transmitted significantly before the OTE character to insure establishment of a connection to the unit for the OTE character (block 70). The OTE character is then transmitted (block 72) at a point in time which causes the character to be received by the unit at the exact time that the on-time-event occurs in the central time-of-day reference 20. The time at which the OTE character is sent by the central time-of-day reference 20 is based on a transmission time calculation for the particular unit to which the OTE character is being sent. The transmission time is calculated when the unit initially comes on line, by determining the elapsed interval between transmission of a control frame and receipt of an acknowledgement by the unit divided by two, and the value is stored. Finally, the OTE character path is terminated (block 74).

Figure 4:
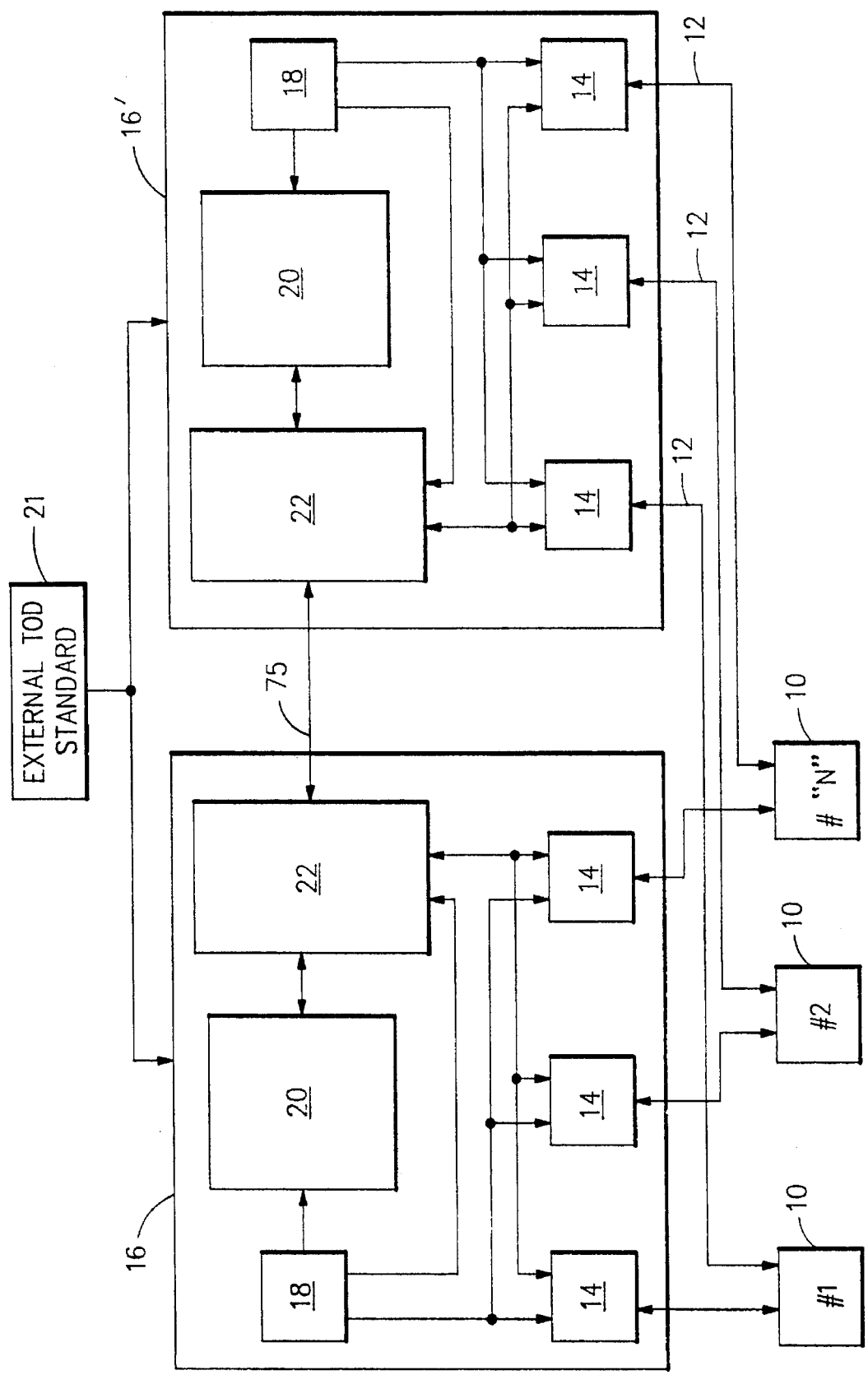
FIG. 4 is a block diagram of a system similar to FIG. 1 showing a backup switch.

FIG. 4 illustrates an embodiment of the invention in which redundant switches 16 and 16' are used to interconnect the units 10. Each of the switches. 16 and 16' includes a clock 18 and counter and control logic 20 for generating and transmitting TOD information. One of the switches (for example the left-hand switch 16 in FIG. 4) serves as the primary TOD reference, and the other serves as a backup in case of failure of the primary. A link 75 extending between the switching logic 22 of switch unit 16 and the switching logic 22 of switch unit 16' provides a communication path between the two central TOD references 20 to maintain synchronization between the two references. Communication protocols on link 75 may be similar to those on links 12 to the units 10. Relative synchronization of the two central TOD references 20 may be achieved in any suitable manner, such as exchanging subdivided clock signals and phase-locking each reference oscillator 18 to the subdivided clock signal of the other unit 16 or 16' as described in the copending applications referred to above.

While the invention has been described in terms of two preferred embodiments, those skilled in the art will recognize that the invention can be practiced with modification within the spirit and scope of the appended claims.

What is claimed is:

1. A method for synchronizing local time-of-day reference counters in each of a plurality of local units in a computer complex in which control logic in a central switch establishes data paths interconnecting said plurality of local units over respective serial data links coupled to ports of said central switch, said control logic being connected to receive messages from said local units via said serial data links, said central switch having a central time-of-day reference source keeping a current time-of-day reference, said method including the steps of:

periodically transmitting from each of said units to said control logic via one of said serial data links a request for a time-of-day reference message;

establishing, in response to each said request, a data path between the requesting unit transmitting such request and said central time-of-day message source;

transmitting over said data path to said requesting unit a time-of-day message containing a combination of characters indicating time and an on-time event character at a time to provide an indication to the requesting unit when the time-of-day message is current; and terminating said data path.

2. A method as recited in claim 1 wherein said on-time event character marks as current said time-of-day message for the requesting unit at the time said on-time event character arrives at the requesting unit.

3. A method for synchronizing local time-of-day reference counters as recited in claim 1, wherein said time of event character provides an indication of when the time-of-day message is current by the time of arrival of the on-time event character at the requesting unit, said on-time event character being transmitted at a time to provide said indication allowing for transmission time of said on-time event character.

4. A system for synchronizing local time-of day reference counters in each of a plurality of local units in a computer complex in which central switch logic in a central switch establishes interconnecting data paths among said plurality of local units via respective serial data links coupled to ports of said central switch, said central switch logic being connected to receive messages from said local units via said data links, said system comprising:

a central time-of-day message generator keeping a current time of day reference;

means at each of said plurality of units for periodically transmitting a request for a time-of-day reference message to said central switch logic via one of said respective serial data links;

said central switch logic establishing, in response to said request, a data path between a requesting unit and said central time-of-day reference generator;

said central time-of-day reference generator transmitting over said data path to said requesting unit a time-of-day message containing a combination of characters indicating time and an on-time event character at a time to indicate to said requesting unit when said time-of-day message is current; and said central switching logic terminating said data path.

5. A method as recited in claim 4 wherein said on-time event character marks as current the time-of-day message for said requesting unit at the time said on-time event character arrives at said requesting unit.

6. The system as recited in claim 4, wherein said on-time event character provides an indication of when said time-of-day message is current by the time of arrival of the on-time event character at the requesting unit, said on-time event character being transmitted by said central time-of-day reference generator at a time to provide said indication to allow for the transmission time of said on-time event character from said central time-of-day reference generator to said requesting unit.

7. A system for synchronizing a local time-of-day reference generator in each of a plurality of units in a computer complex in which said plurality of units are coupled respectively by serial data links to serial ports of a central switch and said plurality of units are interconnected by central switch logic which establishes a data path between said serial ports, said central switch logic being connected to receive messages from said units via said serial data links, said system for synchronizing comprising in combination:

a central time-of-day source having a synchronous clock reference, a central time-of-day counter and control logic for generating a time-of-day message and an on-time character at the central time of day source;

means coupling said synchronous clock reference to said serial ports to provide clocking signals in a data stream coupled to a local unit;

means coupling said central switch logic to said central time-of-day counter and control logic;

each of said plurality of units including a local time-of-day counter, means for deriving said clocking signals to advance said local time-of-day counter from a data stream coupled to said each of said plurality of units, means for generating a request for time-of-day message and for transmitting said request for time-of-day message to said central switch logic;

said central switch logic establishing a first data path from said central time-of-day counter and control logic to the unit requesting a time-of-day message;

said central time-of-day counter and control logic transmitting a time-of-day message to said unit requesting a time-of-day message over said first data path;

said central switch logic terminating said first data path;

said switch logic establishing a second data path between said central time-of-day counter and said control logic and said unit requesting a time-of-day message; and said time-of-day counter and control logic transmitting over said second data path said on-time character at a time to indicate to said unit requesting a time-of-day message when the time of day message is current, said central switch logic terminating said second data path.

8. A method for synchronizing local time-of-day reference counters in each of a plurality of local units in a computer complex in which control logic in a central switch establishes data paths interconnecting said plurality of local units over respective serial data links coupled to ports of said central switch, said control logic being connected to receive messages from said local units via said serial data links, said method including the steps of:

transmitting from each of said units to said central switch logic via its serial data link a request for a time-of-day reference message;

establishing in response to each said request a first data path between the requesting unit transmitting such request and a central time-of-day reference;

transmitting over said first data path a time-of-day message from said central time-of-day reference to said requesting unit;

terminating said first data path;

establishing a second data path between said requesting unit and said central time-of-day reference; and transmitting over said second data path an on-time event character at a time to indicate to the requesting unit when said time-of-day message is current, terminating said second data path.

9. A system for synchronizing local time-of-day reference counters in each of a plurality of local units in a computer complex in which central switch logic in a central switch establishes interconnecting data paths among said plurality of local units via respective serial data links coupled to ports of said central switch, said central switch logic being connected to receive messages from said local units via said serial data links, said system comprising:

a central time-of-day message generator keeping a current time of day reference;

means at each of said plurality of units for periodically transmitting a request for a time-of-day reference message to said central switch logic via said respective serial data link;

said central switch logic establishing, in response to said request, a data path between a requesting unit and said central time-of-day reference generator; and said central time-of-day reference generator transmitting over said data path a time-of-day message to said requesting unit;

said central switching logic terminating said first data path;

said central switching logic establishing a second data path between said requesting unit and said central time-of-day reference generator;

said central time-of-day reference generator transmitting over said second data path an on-time-event character at a time to indicate to said requesting unit when said time-of-day message is current, said central logic terminating said second data path.

10. A system as recited in claim 7 wherein said on-time event character marks the time-of-day message as current at the time of arrival of said on-time event character at said unit requesting a time-of-day message.

11. A method as recited in claim 8 wherein said on-time event character marks as current for the requesting unit said time-of-day message at the time of arrival of said on-time event character at the requesting unit.

12. A system as recited in claim 9 wherein said on-time event character marks as current for said requesting unit said time-of-day message at the time of arrival of said on-time event character at said requesting unit.

* * * * *

UNITED STATES PATENT AND TRADEMARK OFFICE
CERTIFICATE OF CORRECTION

PATENT NO.  : 5,504,878
DATED       : Apr. 2, 1996
INVENTOR(S) : Anthony S. Coscarella et al.

It is certified that error appears in the above-identified patent and that said Letters Patent is hereby corrected as shown below:

Col. 6, line 42,        "method" should be --system--.
   claim 5

Col. 8, line 25,        after "said" insert --first--.
   claim 9                         (1st occurrence)

Signed and Sealed this

Seventeenth Day of September, 1996

Attest:

Attesting Officer

BRUCE LEHMAN

Commissioner of Patents and Trademarks